(No Model.)
J. N. PEW.
VALVE.
No. 556,023. Patented Mar. 10, 1896.
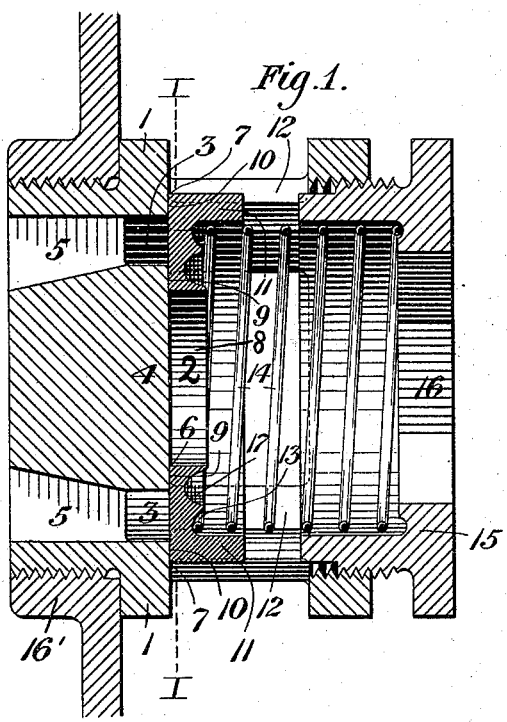
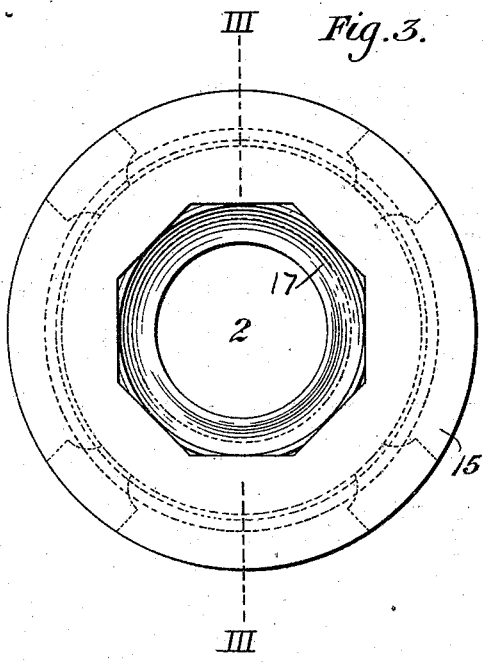
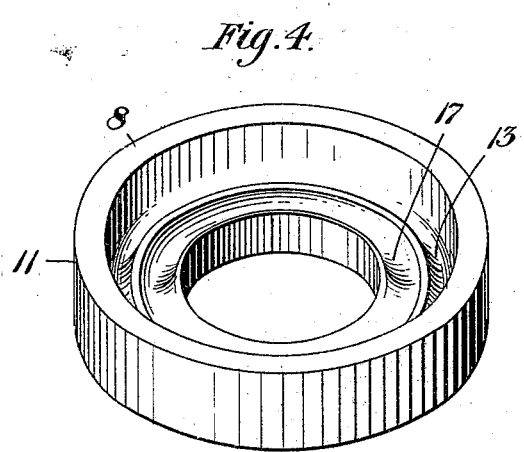
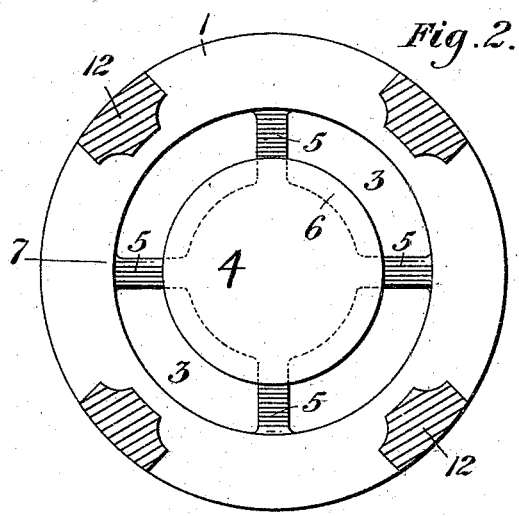
WITNESSES
J H Beal
M. W. Caskey.
INVENTOR
Joseph N. Pew,
by his Attorney,
Wm. L. Pierce.

UNITED STATES PATENT OFFICE.

JOSEPH N. PEW, OF PITTSBURG, PENNSYLVANIA.

VALVE.

SPECIFICATION forming part of Letters Patent No. 556,023, dated March 10, 1896.

Application filed November 13, 1893. Serial No. 490,777. (No model.)

*To all whom it may concern:*

Be it known that I, JOSEPH N. PEW, a citizen of the United States, residing at Pittsburg, in the county of Allegheny and State of Pennsylvania, have invented or discovered a new and useful Valve, of which the following is a specification.

In the accompanying drawings, which make part of this specification, Figure 1 is a vertical section on line III III of Fig. 3; Fig. 2, a horizontal section on line I I of Fig. 1 with the valve and spring removed; Fig. 3, a plan view of valve and cage; Fig. 4, a perspective of the valve, (the above views relating to an outlet-valve; but the principle of my invention is applicable also to inlet-valves.)

My invention relates to the class of lifting-valves, and has been specially designed for use on gas-compressors and in connection with natural-gas service. However, the principle of the valve is applicable to a variety of uses, as for other gases, air, and for liquids generally, and I intend to claim the same broadly.

The primary purpose of my invention, summarily stated, is to secure in a valve the maximum area of discharge with a minimum lift of the valve. Secondly, my valve is made of the minimum amount of metal, and hence its weight is much less than that of other valves having an equal area of discharge. This is an important consideration, as it reduces the wear both of the valve and of its seat and the liability of breaking from the knocking of heavy parts together. Despite this reduction in weight the valve is durable, steady, and reliable in its movements.

In the accompanying drawings, which make part of this specification, 1 is the cage or valve-case. In the end of said cage from which the flow proceeds is inserted a central core 4 supported by lateral arms 5 5, extending to cage 1. This core 4 is of smaller diameter than the internal periphery of cage 1 at the same level, and therefore leaves an annular port 3 between itself and said cage 1. Said arms 5 5 do not extend upward quite to the height of the core 4, leaving the unbroken space around the periphery of said core to permit of the passage of the gas or liquid.

In practice the cage, core, and arms are made in one casting. A ground seat is provided at 6 around the periphery of said core, and a ground seat is also made at 7 around the periphery of the annular port 3.

8 is the valve. Its general form is that of a ring, the diameter of the port 2 in its center being less than that of the core 4. Said valve is provided at 9 and 10 with a ground seat to meet the seats 6 and 7. The exterior of the valve has a vertical flange 11, which slides upon guides 12 12, which are simply inwardly-projecting flanges cast with the cage 1.

At 13 the valve has a circular recess to seat the spring 14, said spring being retained in place on the other end by the screw-follower 15. The central opening 16 in the follower 15 is preferably hexagonal in shape to permit of the introduction of a correspondingly-shaped wrench to unscrew the follower when desirable. The valve-cage is here shown screwed into the head 16' of a compressing-cylinder. 17 is an annular cup in the valve which acts as a trap for the gas and tends to force the valve quickly upon its seat when closing.

The increased efficiency of the valve can be readily understood. As soon as the valve lifts the area of discharge is not confined to the ring-space between the exterior of the valve and the interior of the cage, but simultaneously by the separation of the seats 7 and 10 an additional discharge-port is open and a very free unobstructed escape is given through the center of the valve itself. The obvious and valuable result is that a slight lift of the valve passes a greatly-increased amount of gas or liquid over the valves in ordinary use. Necessarily, also, as a shorter lift will accomplish the purpose, the valve will close quicker, a feature of much importance.

The movement of the valve is steady and balanced through the bearing of the flange 11 upon the guides 12 12.

The drawings show a flat seat, but obviously an oblique beveled seat may be substituted.

The valve also may close by back-pressure, or if set vertical by gravity, and the spring therefore may be omitted.

While I prefer a stemless valve, as the weight is much reduced, the principle of my valve may also be used with a stem.

I claim—

1. The combination of a ring-valve; a valve-case having seats for both the outer and inner periphery of the ring of said valve; ribs upon the interior of the valve-case to guide the movement of the valve by contact with its circumference; discharge-openings in said valve-case and a follower secured at the opposite end of said case from the valve-seats.

2. The combination of a valve-case having a flat internal and a flat peripheral seat, said case being provided with lateral discharge-openings and a follower with a discharge-passage and secured to the periphery of the case.

3. The combination of a ring-valve with substantially flat base; a valve-casing having seats for both the outer and inner periphery of the ring of said valve; a spring acting to keep said valve upon its seat; a follower receiving one end of the spring and holding the same in tension against the valve; discharge-openings in said valve-case and means for guiding the valve in its motion.

In testimony whereof I have hereunto set my hand this 30th day of October, A. D. 1893.

JOSEPH N. PEW.

Witnesses:
WM. L. PIERCE,
W. T. MARSHALL.